(12) United States Patent
Cuellar et al.

(10) Patent No.: US 9,206,726 B2
(45) Date of Patent: Dec. 8, 2015

(54) EXHAUST MODE SELECTOR SYSTEM (71) Applicant: Continental Automotive Systems, Inc., Auburn Hills, MI (US)

(72) Inventors: Juan Guillermo Martinez Cuellar, Zapopan (MX); Carlos Ernesto Colina Gallardo, Tlaquepaque (MX); Marco Antonio Lopez Vidaurri, Guadalajara (MX); Marco Antonio Aguilar Molina, Zapopan (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 436 days.

(21) Appl. No.: 13/712,071

(22) Filed: Dec. 12, 2012

(65) Prior Publication Data

US 2014/0161671 A1  Jun. 12, 2014

(51) Int. Cl.
| | |
|---|---|
| *B01D 50/00* | (2006.01) |
| *F01N 3/20* | (2006.01) |
| *F01N 13/08* | (2010.01) |
| *F16K 13/00* | (2006.01) |
| *F16L 55/00* | (2006.01) |
| *F01N 13/04* | (2010.01) |
| *F01N 3/021* | (2006.01) |
| *F01N 1/00* | (2006.01) |
| *F01N 13/00* | (2010.01) |

(52) U.S. Cl.
CPC *F01N 3/208* (2013.01); *F01N 1/00* (2013.01); *F01N 3/021* (2013.01); *F01N 3/2066* (2013.01); *F01N 13/011* (2014.06); *F01N 13/04* (2013.01); *F01N 13/08* (2013.01); *F16K 13/00* (2013.01); *F16L 55/00* (2013.01); *F01N 2410/00* (2013.01); *F01N 2590/08* (2013.01); *F01N 2610/02* (2013.01); *F01N 2900/12* (2013.01); *Y02T 10/24* (2013.01); *Y10T 137/794* (2015.04); *Y10T 137/877* (2015.04)

(58) Field of Classification Search
CPC ........... F01N 1/00; F01N 13/04; F01N 3/208; F01N 13/08; F01N 2590/08; Y10T 10/24
USPC .................. 422/168, 171, 177, 115; 181/228
See application file for complete search history.

(56) References Cited

U.S. PATENT DOCUMENTS

| | | | |
|---|---|---|---|
| 4,281,741 A | 8/1981 | Blaser | |
| 5,125,231 A * | 6/1992 | Patil et al. ........................ | 60/274 |
| 5,452,578 A | 9/1995 | Barber | |
| 6,158,213 A | 12/2000 | Linberg | |
| 2007/0294999 A1* | 12/2007 | Yoshizaki et al. ............... | 60/274 |
| 2010/0199839 A1* | 8/2010 | Zhang et al. ...................... | 95/23 |

* cited by examiner

Primary Examiner — Tom P Duong (57) ABSTRACT

The present invention is an exhaust mode selector system which is able to control an exhaust system, as the exhaust system changes to accommodate various driving conditions. The exhaust system includes various exhaust flow paths to configure the exhaust system for operating in a highway mode, used for when the vehicle is operating on the highway, and a city mode, used for when the vehicle is operating under city driving conditions. A controller is able to position one or more valves to various configurations to transition between city driving and highway driving. Each of the valves being configurable provides for optimization of the balance between required power, fuel economy, and noise reduction.

22 Claims, 5 Drawing Sheets

EXHAUST MODE SELECTOR SYSTEM

FIELD OF THE INVENTION

The invention relates generally to an exhaust mode selector system which is operable for changing between multiple modes of operation to accommodate for different modes of driving.

BACKGROUND OF THE INVENTION

Exhaust systems are generally known, and are used not only for directing the exhaust gas from an engine away from a vehicle, but are also used to control various emissions of an engine, and to help optimize fuel economy.

Many attempts have been made to improve the functionality of exhaust systems. However, because of the wide range of driving conditions, such as highway driving and city driving, exhaust systems are not always suitable for optimizing fuel economy, reducing emissions, and maximizing engine power. More specifically, an exhaust system which is optimized for conditions such as highway driving, which involve a more consistent engine speed, fewer stops, and increased fuel economy, may be different than an exhaust system which is optimized for city driving conditions, which have less consistent engine speed, many stops, and decreased fuel economy.

Accordingly, there exists a need for an exhaust system which is adaptable for various types of driving conditions.

SUMMARY OF THE INVENTION

The present invention is an exhaust mode selector system which is able to control an exhaust system, as the exhaust system changes to accommodate various driving conditions. The exhaust system includes a highway mode, used for when the vehicle is operating on the highway, and a city mode, used for when the vehicle is operating under city driving conditions.

In one embodiment, the present invention is an exhaust system having multiple modes of operation and multiple flow paths. An engine generates exhaust gas that is directed along a first exhaust flow path, or a second exhaust flow path. Also included is a first vehicle emissions control device, such as a catalytic converter or a diesel particulate filter (DPF), which is in fluid communication with the engine, and receives exhaust gas from the engine. A first cutout has a first valve, a primary inlet connected to and in fluid communication with the first vehicle emissions control device, a first outlet, and a second outlet.

A second vehicle emissions control device, such as a second catalytic converter, or a second DPF, is in fluid communication with the first cutout. The present invention also includes a second cutout having a second valve, a first inlet, a second inlet, and a primary outlet. The second cutout is connected to and in fluid communication with the first cutout and the second vehicle emission control device. A controller controls the operation of the first valve and the second valve. A resonator is in fluid communication with the primary outlet of the second cutout.

In an embodiment, the exhaust system not only includes a first catalytic converter and a second catalytic converter used as the respective first and second vehicle emissions control devices, but also includes a first muffler in fluid communication with the first outlet of the first cutout and the first inlet of the second cutout, and a second muffler in fluid communication with the second catalytic converter and the second inlet of the second cutout.

The controller positions the first valve and the second valve to direct the exhaust gas from the first catalytic converter into the primary inlet and through the first outlet of the first cutout, through the first muffler, and into the first inlet of the second cutout, out of the primary outlet, and through the resonator when the exhaust system is operating under highway driving conditions. The controller is also able to position the first valve and the second valve to direct the exhaust gas from the first catalytic converter into the primary inlet and through the second outlet of the first cutout, through the second catalytic converter, through the second muffler, and into the second inlet of the second cutout, out of the primary outlet, and through the resonator when the exhaust system is operating under city driving conditions.

In another embodiment, the first vehicle emissions control device is a first diesel particulate filter, and the second vehicle emissions control device is a second diesel particulate filter. A first Selective Catalytic Reduction (SCR) catalyst is in fluid communication with the first outlet of the first cutout and the first inlet of the second cutout, and a second SCR catalyst in fluid communication with the second DPF and the second inlet of the second cutout.

In this embodiment, the controller positions the first valve and the second valve to direct the exhaust gas from the first diesel particulate filter into the primary inlet and through the first outlet of the first cutout, through the first SCR catalyst, and into the first inlet of the second cutout, out of the primary outlet, and through the resonator when the exhaust system is operating under highway driving conditions. The controller also positions the first valve and the second valve to direct the exhaust gas from the first diesel particulate filter into the primary inlet and through the second outlet of the first cutout, through the second diesel particulate filter, through the second SCR catalyst, and into the second inlet of the second cutout, out of the primary outlet, and through the resonator when the exhaust system is operating under city driving conditions.

This embodiment also includes a diesel exhaust fluid (DEF) tank in fluid communication with the exhaust system upstream of the first SCR catalyst and in fluid communication with the exhaust system upstream of the second SCR catalyst, an SCR valve in fluid communication with the DEF tank, a first fluid delivery pipe in fluid communication with the SCR valve, and a second fluid delivery pipe in fluid communication with the SCR valve.

The SCR valve transfers diesel exhaust fluid through the first fluid delivery pipe to a location upstream of the first SCR catalyst when the exhaust system is operating under highway driving conditions, and transfers diesel exhaust fluid through the second fluid delivery pipe to a location upstream of the second SCR catalyst when the exhaust system is operating under city driving conditions.

With each embodiment, the controller is able to position each of the valves to other various configurations to transition between city driving conditions and highway driving conditions. Each of the valves being configurable provides for optimization of the balance between required power, fuel economy, and noise reduction.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
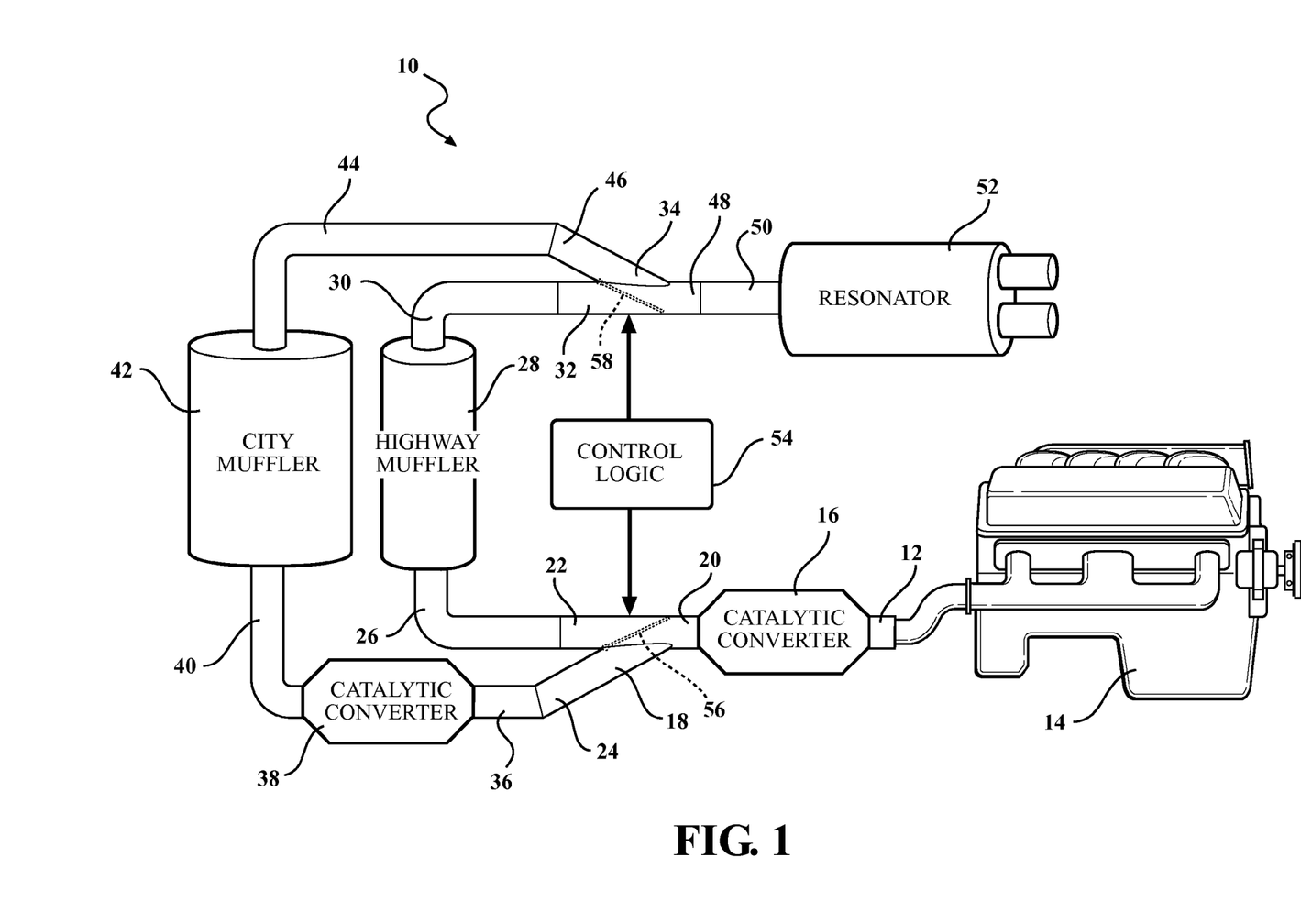
FIG. 1 is a diagram of an exhaust mode selector system, according to embodiments of the present invention.

An exhaust system, having multiple exhaust flow paths is shown generally in the Figures schematically at 10. The exhaust system 10 includes an exhaust pipe 12 connected to an engine 14 used to propel a vehicle. The exhaust pipe 12 is connected to a first catalytic converter 16, and the first catalytic converter 16 is connected to a first cutout 18. The first cutout 18 is an inlet cutout 18, and includes a primary inlet 20, and two outlets, a first outlet 22 and a second outlet 24. The first outlet 22 is connected to a first exhaust delivery pipe 26, and the first exhaust delivery pipe 26 is connected to a highway muffler 28. The highway muffler 28 is connected to a second exhaust delivery pipe 30, and the second exhaust delivery pipe 30 is connected to first inlet 32 of a second cutout 34.

The second outlet 24 is connected to a first exhaust transfer pipe 36, and the first exhaust transfer pipe 36 is connected to a second catalytic converter 38. The second catalytic converter 38 is connected to an intermediate exhaust transfer pipe 40, and the intermediate exhaust transfer pipe 40 is connected to a city muffler 42. The city muffler 42 in turn is connected to a second exhaust transfer pipe 44, and the second exhaust transfer pipe 44 is connected to a second inlet 46 of the second cutout 34.

The second cutout 34 is an outlet cutout 34, and also includes a primary outlet 48 which is connected to a resonator pipe 50, and the resonator pipe 50 is connected to a resonator 52.

Control over the flow of exhaust gas through each of the cutouts 18,34 is achieved through the use of a controller 54. Each of the cutouts 18,34 includes a valve, the operation of which is controlled by the controller 54. More specifically, there is a first valve 56 which is part of the first cutout 18, and a second valve 58 which is part of the second cutout 34.

Figure 2:
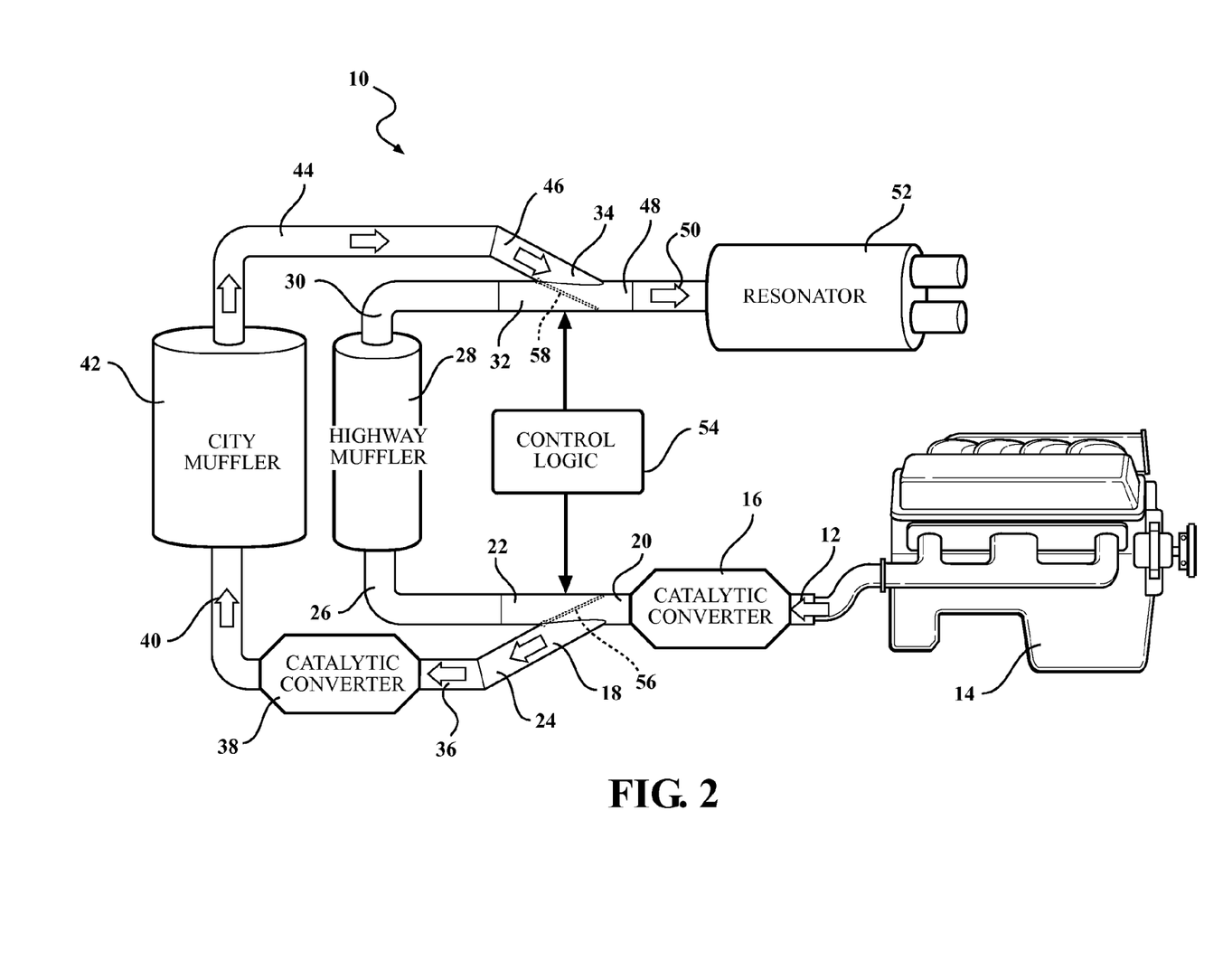
FIG. 2 is a diagram of an exhaust mode selector system operating in a first mode of operation, according to embodiments of the present invention.

During operation of the system 10, if the vehicle is driving on a highway, or other type of road where driving conditions include relatively higher speeds (such as fifty-five miles per hour or greater) with few stops, the controller 54 commands each of the valves 56,58 to move to a first position. The first position of the first valve 56 prevents exhaust flow from exiting the second outlet 24, such that all of the exhaust gas flowing into the inlet 20 flows out of the first outlet 22. The first position of the second valve 58 allows for exhaust gas entering the first inlet 32 to pass through the second cutout 34 and exit the primary outlet 48, and prevents exhaust flow entering the second inlet 46 from exiting the primary outlet 48.

When both of the valves 56,58 are in the first position, the exhaust gases produced by the engine 14 flow through the exhaust pipe 12, the first catalytic converter 16, the first cutout 18, the first exhaust delivery pipe 26, the highway muffler 28, the second exhaust delivery pipe 30, the second cutout 34, the resonator pipe 50, and the resonator 52. The flow through the first catalytic converter 16, the first cutout 18, the first exhaust delivery pipe 26, the highway muffler 28, the second exhaust delivery pipe 30, and the second cutout 34 creates a first exhaust flow path. When the exhaust system 10 is in this first condition, or first mode of operation, the exhaust flow is least restrictive, allowing for less backpressure, and allows for more of the power produced by the engine to be used to propel the vehicle.

Figure 3:
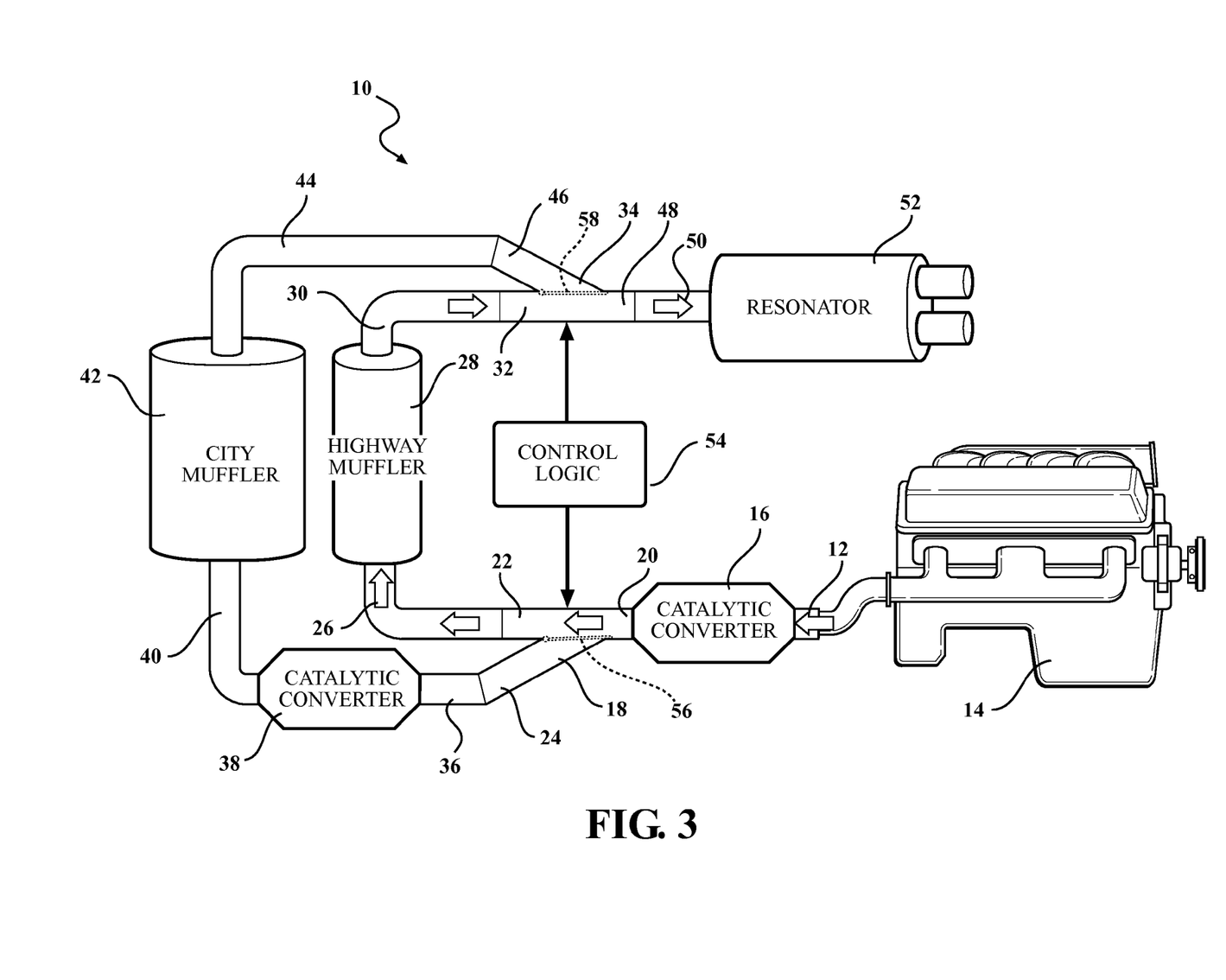
FIG. 3 is a diagram of an exhaust mode selector system operating in a second mode of operation, according to embodiments of the present invention.

If the vehicle is driving at lower speeds and is experiencing frequent stops (or "stop and go" driving) such as when the vehicle is driving in the city, the controller 54 commands each of the valves 56,58 to move to a second position. The second position of the first valve 56 prevents exhaust flow from exiting the first outlet 22, and forces all of the exhaust gas to flow out of the second outlet 24. The second position of the second valve 58 allows for exhaust gas entering the second inlet 46 to pass through the second cutout 34 and exit the primary outlet, and prevents exhaust flow entering the first inlet 32 from exiting the primary outlet 48.

When both of the valves 56,58 are in the second position, the exhaust gases from the engine 14 flow through the exhaust pipe 12, the first catalytic converter 16, the first cutout 18, the first exhaust transfer pipe 36, the second catalytic converter 38, the intermediate exhaust transfer pipe 40, the city muffler 42, the second exhaust transfer pipe 44, the second cutout 34, the resonator pipe 50, and the resonator 52. The flow through the first catalytic converter 16, the first cutout 18, the first exhaust transfer pipe 36, the second catalytic converter 38, the intermediate exhaust transfer pipe 40, the city muffler 42, the second exhaust transfer pipe 44, and the second cutout 34 creates a second exhaust flow path. When the exhaust system 10 is in this second condition, or second mode of operation, the exhaust flow is more restrictive because the exhaust gas passes through both catalytic converters 16,38, and the city muffler 42 is larger than the highway muffler 28. This mode provides for reduced emissions and reduced noise, and although this mode also reduces the performance ability of the engine 14, maximizing performance during city driving is not necessary, and therefore the reduction in available power is not considered a significant drawback in light of the improved efficiency and noise reduction.

In addition to the valves 56,58 being placed in their respective first positions and the second positions, the valves 56,58 are able to be placed into any position between the first positions and the second positions, allowing for the exhaust system 10 to transition between highway driving and city driving. The controller 54 controls the positioning of each of the valves 56,58, between the various positions, controlling the flow of exhaust gas between the first exhaust flow path and the second exhaust flow path. The controller 54 may position the valves 56,58 to direct a portion of the exhaust gas through the first exhaust flow path, and another portion of the exhaust gas through the second exhaust flow path during the transition between city driving and highway driving. How the flow of exhaust gas is distributed between the first exhaust flow path and the second exhaust flow path is based upon a number of factors which include, but are not limited to, the speed of the vehicle, the amount of stop and go driving, fuel economy, noise control, emissions control, and the like.

Figure 4:
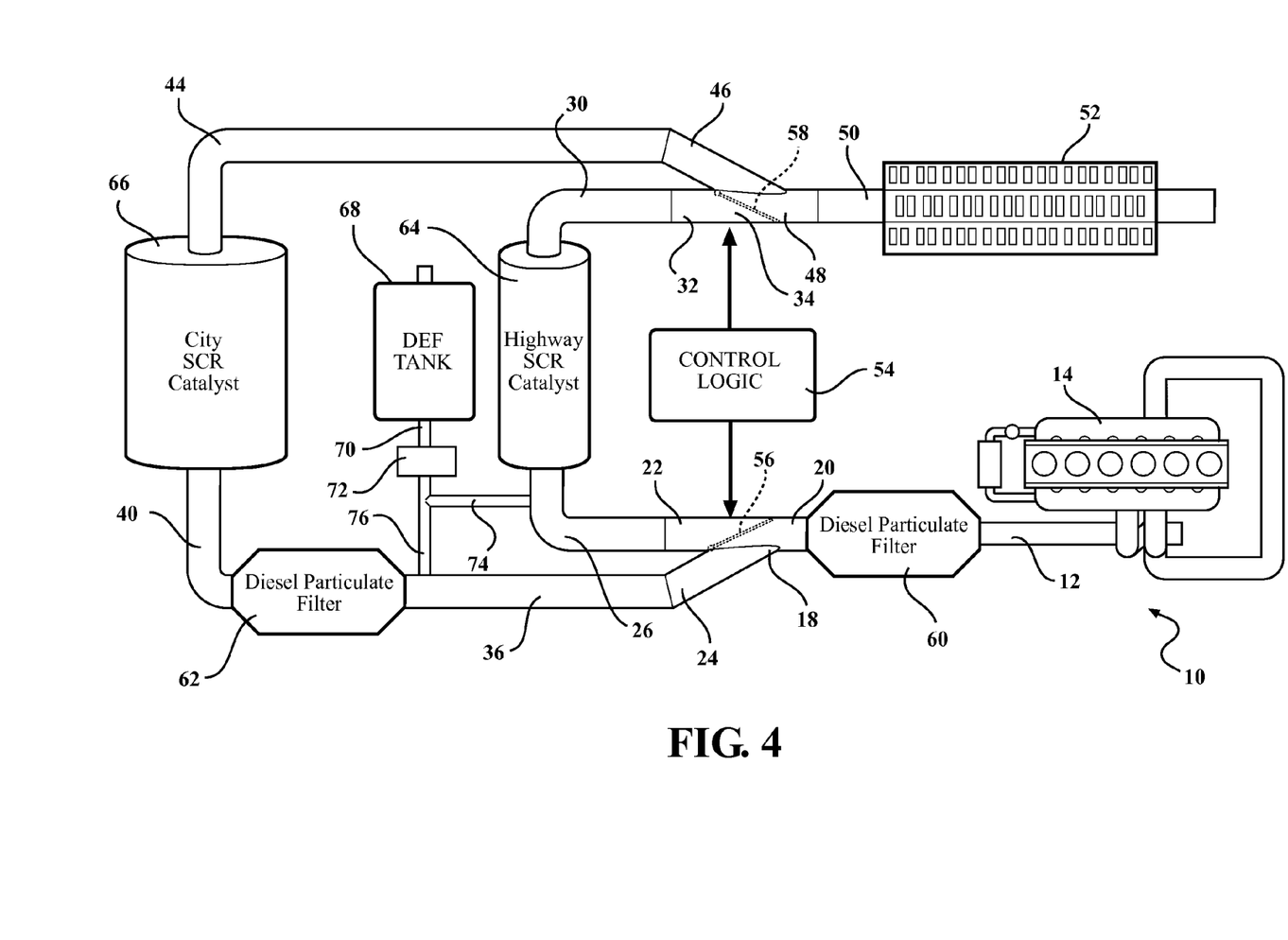
FIG. 4 is a diagram of an alternate embodiment of an exhaust mode selector system, according to embodiments of the present invention.
Figure 5:
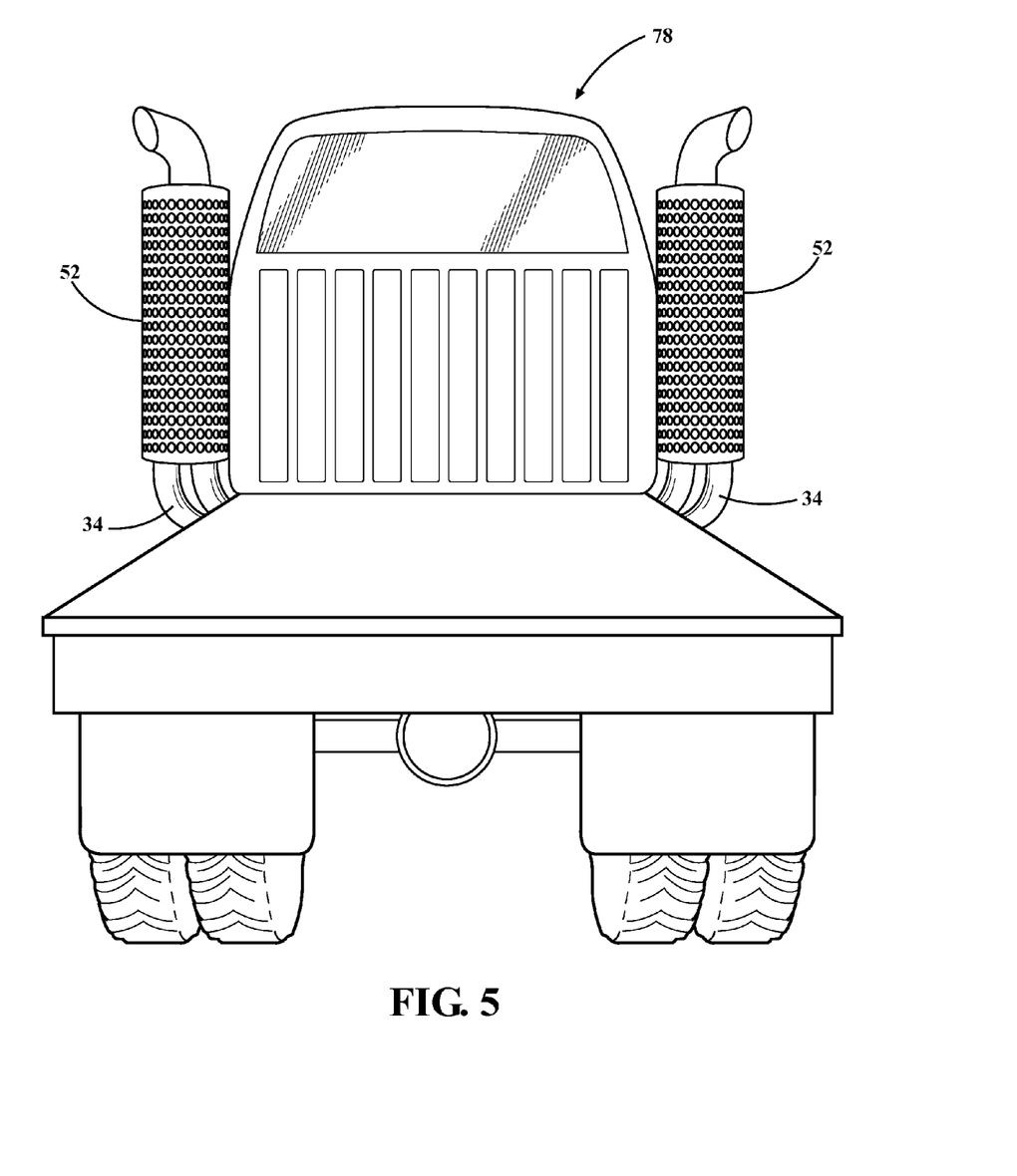
FIG. 5 is a rear view of a vehicle which includes an exhaust mode selector system, according to embodiments of the present invention.

An alternate embodiment of the invention is shown in FIGS. 4 and 5, with like numbers referring to like elements. The embodiment shown in FIGS. 4 and 5 is for use with a commercial vehicle, shown generally at 78, which has different emissions resulting from the use of a different type of fuel, such as diesel fuel. More specifically, the embodiment shown in FIGS. 4 and 5 incorporates the process of Selective Catalytic Reduction (SCR). In this embodiment, instead of using catalytic converters 16,38, a first diesel particulate filter 60 is connected to the exhaust pipe 12 and the primary inlet 20 of the first cutout 18, and a second diesel particulate filter 62 is connected to the first exhaust transfer pipe 36 and the intermediate exhaust transfer pipe 40. Furthermore, instead of the mufflers 28,42, the system 10 includes a first SCR catalyst 64 connected to the first exhaust delivery pipe 26 and the second exhaust delivery pipe 30, and a second SCR catalyst 66 connected to the intermediate exhaust transfer pipe 40 and the second exhaust transfer pipe 44.

Also included in the embodiment shown in FIGS. 4 and 5 is a Diesel Exhaust Fluid (DEF) tank 68 having diesel exhaust fluid. The DEF tank 68 includes an outlet pipe 70, an SCR valve 72, a first delivery pipe 74 and a second delivery pipe 76.

In operation, the engine 14 (which in this embodiment is a diesel engine) produces exhaust emissions, which flow through the exhaust pipe 12 and into the first diesel particulate filter 60. The exhaust gas then flows into the first cutout 18. Both valves 56,58 in each of the cutouts 18,34 are able to change between a first position and a second position.

As with the previous embodiment, the first position of the first valve 56 prevents exhaust flow from exiting the second outlet 24, such that all of the exhaust gas flowing into the inlet 20 flows out of the first outlet 22. Furthermore, the first position of the second valve 58 allows for exhaust gas entering the first inlet 32 to pass through the second cutout 34 and exit the primary outlet 48, and prevents exhaust flow entering the second inlet 46 from exiting the primary outlet 48. When the valves 56,58 of both the cutouts 18,34 are in their respective first positions, the exhaust gases produced by the engine 14 flow through the exhaust pipe 12, the first diesel particulate filter 60, the first cutout 18, the first exhaust delivery pipe 26, the highway SCR catalyst 64, the second exhaust delivery pipe 30, the second cutout 34, the resonator pipe 50, and the resonator 52. The flow of exhaust gas through the first diesel particulate filter 60, the first cutout 18, the first exhaust delivery pipe 26, the highway SCR catalyst 64, the second exhaust delivery pipe 30, and the second cutout 34 creates a first exhaust flow path.

When the exhaust system 10 is in this condition, or mode, the exhaust flow is least restrictive, allowing for less back-pressure, and more power produced by the engine to be used to propel the vehicle.

When the vehicle is operating under city driving conditions, the controller 54 commands the valves 56,58 to move to their respective second positions. When the valves 56,58 are both in their respective second positions, the first valve 56 prevents exhaust gas from exiting the first outlet 22, and forces all of the exhaust gas to flow out of the second outlet 24. The second position of the second valve 58 allows for exhaust gas entering the second inlet 46 to pass through the second cutout 34 and exit the primary outlet, and prevents any exhaust gas entering the first inlet 32 from exiting the primary outlet 48.

When both of the valves 56,58 are in their respective second positions, the exhaust gases from the engine 14 flow through the exhaust pipe 12, the first diesel particulate filter 60, the first cutout 18, the first exhaust transfer pipe 36, the second diesel particulate filter 62, the intermediate exhaust transfer pipe 40, the city SCR catalyst 66, the second exhaust transfer pipe 44, the second cutout 34, the resonator pipe 50, and the resonator 52. The flow of exhaust gas through the first diesel particulate filter 60, the first cutout 18, the first exhaust transfer pipe 36, the second diesel particulate filter 62, the intermediate exhaust transfer pipe 40, the city SCR catalyst 66, the second exhaust transfer pipe 44, and the second cutout 34 creates a second exhaust flow path. When the exhaust system 10 is in this second condition, or second mode of operation, the exhaust flow is more restrictive because the exhaust gas passes through both diesel particulate filters 60,62, and the city SCR catalyst 66 is larger than the highway SCR catalyst 64. This mode of operation provides for reduced emissions and reduced noise, and although this mode also reduces the performance ability of the engine 14, maximizing performance during city driving is not necessary, and therefore the reduction in available power is not considered a significant drawback in light of the improved efficiency and noise reduction.

During either mode of operation, the diesel exhaust fluid in the DEF tank 68 may be used to reduce the emission of oxides of nitrogen. The valve 72 is controlled by the controller 54, and is used to inject diesel exhaust fluid from the outlet pipe 70 through the first delivery pipe 74 and into the first exhaust delivery pipe 26, or inject diesel exhaust fluid from the outlet pipe 70 through the second delivery pipe 76 and into the first exhaust transfer pipe 36. When the diesel exhaust fluid is injected to either the first exhaust delivery pipe 26 or the first exhaust transfer pipe 36, the diesel exhaust fluid mixes with the exhaust gas, and when combined with the either of the SCR catalysts 64,66, emissions of oxides of nitrogen are reduced. The DEF is injected into the first exhaust flow path, more specifically the first exhaust delivery pipe 26 when operating in the first mode of operation, and injected into the second exhaust flow path, more specifically the first exhaust transfer pipe 36, when operating in the second mode of operation.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. An apparatus, comprising:
    an exhaust system having multiple modes of operation, including:
        a first exhaust flow path;
        a second exhaust flow path;
        a first vehicle emissions control device disposed in the first exhaust flow path;
        a second vehicle emissions control device disposed in the second exhaust flow path;
        at least one valve for directing exhaust gas between the first exhaust flow path and the second exhaust flow path;
        a first valve located downstream of the first vehicle emissions control device and upstream of the second vehicle emission control device;
        a second valve located downstream of the first vehicle emissions control device and downstream of the second vehicle emissions control device;

a first cutout connected to the first exhaust flow path and the second exhaust flow path, the first valve being disposed in the first cutout; and a second cutout connected to the first exhaust flow path and the second exhaust flow path, the second valve being disposed in the second cutout;

wherein the exhaust gas flows through the first vehicle emissions control device when the at least one valve is configured for diverting the exhaust gas through the first exhaust flow path, and the exhaust gas flows through the first vehicle emissions control device and the second vehicle emissions control device when the at least one valve is configured for diverting the exhaust gas through the second exhaust flow path, and the first valve and the second valve are placed in multiple positions to configure the exhaust system to direct exhaust gas through the first exhaust flow path and the second exhaust flow path.

2. The apparatus of claim 1, the first cutout further comprising:
a primary inlet connected to and in fluid communication with the first vehicle emissions control device;
a first outlet for directing exhaust gas through the first exhaust flow path; and
a second outlet for directing exhaust gas through the second exhaust flow path;
wherein the first valve is able to be positioned to direct the exhaust gas through the first exhaust flow path, and is able to be positioned to direct the exhaust gas through the second exhaust flow path, and any position therebetween.

3. The apparatus of claim 1, the second cutout further comprising:
a first inlet for receiving exhaust gas from the first exhaust flow path;
a second inlet for receiving exhaust gas from the second exhaust flow path; and
a primary outlet for receiving exhaust gas from the first inlet and the second inlet;
wherein the second valve is able to be positioned such that the second cutout receives exhaust gas from the first exhaust flow path, and is able to be positioned such that the second cutout receives exhaust gas from the second exhaust flow path, and any position therebetween.

4. The apparatus of claim 1, wherein the first vehicle emissions control device is a first catalytic converter, and the second vehicle emissions control device is a second catalytic converter.

5. The apparatus of claim 4, further comprising:
a first muffler disposed in the first exhaust flow path downstream of the first catalytic converter; and
a second muffler disposed in the second exhaust flow path downstream from the second catalytic converter;
wherein the at least one valve directs exhaust gas through the first exhaust flow path such that the exhaust gas passes through the first catalytic converter and the first muffler, and the at least one valve directs exhaust gas through the second exhaust flow path such that the exhaust gas passes through the first catalytic converter, the second catalytic converter, and the second muffler.

6. The apparatus of claim 1, the first vehicle emissions control device further comprising a first diesel particulate filter (DPF) located upstream of the at least one valve.

7. The apparatus of claim 6, the second vehicle emissions control device further comprising a second diesel particulate filter (DPF) located downstream of the at least one valve.

8. The apparatus of claim 7, further comprising:
a first selective catalytic reduction (SCR) catalyst located downstream of the at least one valve; and
a second SCR catalyst located downstream of the second DPF;
wherein the exhaust gas flows through the first DPF, the at least one valve, and the first SCR catalyst when the exhaust gas is flowing through the first exhaust flow path, and the exhaust gas flows through the first DPF, the at least one valve, the second DPF, and the second SCR catalyst when the exhaust gas is flowing through the second exhaust flow path.

9. The apparatus of claim 8, further comprising:
a diesel exhaust fluid (DEF) tank in fluid communication with the first exhaust flow path upstream of the first SCR catalyst and in fluid communication with the second exhaust flow path upstream of the second SCR catalyst;
an SCR valve in fluid communication with the DEF tank;
a first delivery pipe in fluid communication with the SCR valve; and
a second delivery pipe in fluid communication with the SCR valve;
wherein the SCR valve selectively transfers diesel exhaust fluid through the first delivery pipe to a location upstream of the first SCR catalyst when the exhaust gas is directed through the first exhaust flow path, and transfers diesel exhaust fluid through the second delivery pipe to a location upstream of the second SCR catalyst when the exhaust gas is directed through the second exhaust flow path.

10. The apparatus of claim 1, further comprising a resonator in fluid communication with the first exhaust flow path, and the second exhaust flow path, the resonator reducing the amount of noise produced by the exhaust system.

11. An exhaust system having multiple flow paths, comprising:
a first vehicle emissions control device upstream of a first exhaust flow path and a second exhaust flow path;
a second vehicle emissions control device located along the second exhaust flow path and downstream of the first vehicle emissions control device;
a first cutout having a first valve, the first valve configures the first cutout to direct exhaust gas from the first vehicle emissions control device to the first exhaust flow path, the second exhaust flow path, and combinations thereof;
a second cutout having a second valve, the first valve configures the second cutout to receive exhaust gas from the first exhaust flow path, the second exhaust flow path, and combinations thereof;
a first inlet for receiving exhaust gas from the first exhaust flow path;
a second inlet for receiving exhaust gas from the second exhaust flow path; and
a primary outlet for receiving exhaust gas from the first inlet and the second inlet;
wherein the second cutout directs exhaust gas from the first inlet out of the primary outlet when the second valve is configured to direct exhaust through the first exhaust flow path, and the second cutout directs exhaust gas from the second inlet out of the primary outlet when the when the second valve is configured to direct exhaust gas through the second exhaust flow path.

12. The exhaust system having multiple flow paths of claim 11, the first cutout further comprising:
a primary inlet connected to and in fluid communication with the first vehicle emissions control device;

a first outlet for directing exhaust gas through the first exhaust flow path; and a second outlet for directing exhaust gas through the second exhaust flow path;

wherein the first cutout directs exhaust gas from the primary inlet out of the first outlet when the first valve is configured to direct exhaust through the first exhaust flow path, and the first cutout directs exhaust gas from the primary inlet out of the second outlet when the when the first valve is configured to direct exhaust gas through the second exhaust flow path.

13. The exhaust system having multiple flow paths of claim 11, wherein the first vehicle emissions control device is a first catalytic converter, and the second vehicle emissions control device is a second catalytic converter.

14. The exhaust system having multiple flow paths of claim 13, further comprising:

a first muffler located downstream of the first cutout, and upstream of the second cutout, the first muffler being part of the first exhaust flow path; and a second muffler downstream of the second catalytic converter, and upstream of the second cutout, the second muffler being part of the second exhaust flow path;

wherein the first valve and the second valve direct exhaust gas through the first exhaust flow path such that the exhaust gas passes through the first catalytic converter and the first muffler, and the first valve and the second valve direct exhaust gas through the second exhaust flow path such that the exhaust gas passes through the first catalytic converter, the second catalytic converter, and the second muffler.

15. The exhaust system having multiple flow paths of claim 11, the first vehicle emissions control device further comprising a first diesel particulate filter (DPF), and the second vehicle emissions control device further comprising a second diesel particulate filter (DPF), the second DPF being located downstream of the at least one valve.

16. The exhaust system having multiple flow paths of claim 15, further comprising:

a first SCR catalyst located downstream of the first cutout and upstream of the second cutout;

a second SCR catalyst located downstream of the second DPF, and upstream of the second cutout;

a diesel exhaust fluid (DEF) tank in fluid communication with the first exhaust flow path upstream of the first SCR catalyst and in fluid communication with the second exhaust flow path upstream of the second SCR catalyst;

an SCR valve in fluid communication with the DEF tank;

a first delivery pipe in fluid communication with the SCR valve; and a second delivery pipe in fluid communication with the SCR valve;

wherein the SCR valve transfers diesel exhaust fluid through the first delivery pipe to a location upstream of the first SCR catalyst when the exhaust gas is flowing through the first exhaust flow path, and transfers diesel exhaust fluid through the second delivery pipe to a location upstream of the second SCR catalyst when the exhaust gas is flowing through the second exhaust flow path.

17. An exhaust system having multiple modes of operation, comprising:

an engine which generates exhaust gas;

a first vehicle emissions control device which is in fluid communication with the engine, and receives exhaust gas from the engine;

a first cutout having a first valve, a primary inlet connected to the first vehicle emissions control device, a first outlet and a second outlet, the first cutout connected to and in fluid communication with the first vehicle emissions control device;

a second vehicle emissions control device in fluid communication with the first cutout;

a second cutout having a second valve, a first inlet, a second inlet, and a primary outlet, the second cutout connected to and in fluid communication with the first cutout and the second vehicle emission control device;

a controller which controls the operation of the first valve and the second valve; and a resonator in fluid communication with the primary outlet of the second cutout;

wherein the first valve and the second valve are positioned to direct the exhaust gas from the first vehicle emissions control device into the primary inlet and through the first outlet of the first cutout, and into the first inlet of the second cutout, out of the primary outlet, and through the resonator when the exhaust system is operating in a first mode of operation, and the first valve and the second valve are positioned to direct the exhaust gas from the first vehicle emissions control device into the primary inlet and through the second outlet of the first cutout, through the second vehicle emissions control device, and into the second inlet of the second cutout, out of the primary outlet, and through the resonator when the exhaust system is operating in a second mode of operation.

18. The exhaust system having multiple modes of operation of claim 17, wherein the first vehicle emissions control device is a first catalytic converter, and the second vehicle emissions control device is a second catalytic converter.

19. The exhaust system having multiple modes of operation of claim 18, further comprising:

a first muffler in fluid communication with the first outlet of the first cutout and the first inlet of the second cutout; and a second muffler in fluid communication with the second catalytic converter and the second inlet of the second cutout;

wherein the first valve and the second valve are positioned to direct the exhaust gas from the first catalytic converter into the primary inlet and through the first outlet of the first cutout, through the first muffler, and into the first inlet of the second cutout, out of the primary outlet, and through the resonator when the exhaust system is operating in the first mode of operation, and the first valve and the second valve are positioned to direct the exhaust gas from the first catalytic converter into the primary inlet and through the second outlet of the first cutout, through the second catalytic converter, through the second muffler, and into the second inlet of the second cutout, out of the primary outlet, and through the resonator when the exhaust system is operating in the second mode of operation.

20. The exhaust system having multiple modes of operation of claim 17, wherein the first vehicle emissions control device is a first diesel particulate filter, and the second vehicle emissions control device is a second diesel particulate filter.

21. The exhaust system having multiple modes of operation of claim 20, further comprising:

a first SCR catalyst in fluid communication with the first outlet of the first cutout and the first inlet of the second cutout; and a second SCR catalyst in fluid communication with the second outlet of the first cutout and the second inlet of the second cutout;

wherein the first valve and the second valve are positioned to direct the exhaust gas from the first diesel particulate filter into the primary inlet and through the first outlet of the first cutout, through the first SCR catalyst, and into the first inlet of the second cutout, out of the primary outlet, and through the resonator when the exhaust system is operating in the first mode of operation, and the first valve and the second valve are positioned to direct the exhaust gas from the first diesel particulate filter into the primary inlet and through the second outlet of the first cutout, through the second diesel particulate filter, through the second SCR catalyst, and into the second inlet of the second cutout, out of the primary outlet, and through the resonator when the exhaust system is operating in the second mode of operation.

22. The exhaust system having multiple modes of operation of claim 21, further comprising:
- a diesel exhaust fluid (DEF) tank in fluid communication upstream of the first SCR catalyst and in fluid communication upstream of the second SCR catalyst;
- an SCR valve in fluid communication with the DEF tank;
- a first delivery pipe in fluid communication with the SCR valve; and
- a second delivery pipe in fluid communication with the SCR valve;
- wherein the SCR valve transfers diesel exhaust fluid through the first delivery pipe to a location upstream of the first SCR catalyst when the exhaust system is operation the first mode of operation, and transfers diesel exhaust fluid through the second delivery pipe to a location upstream of the second SCR catalyst when the exhaust system is operating in the second mode of operation.

* * * * *